(12) United States Patent
Heuer et al.

(10) Patent No.: US 7,712,789 B2
(45) Date of Patent: May 11, 2010

(54) ADAPTER FOR COUPLING CONNECTING PIPES IN A COMMERCIAL AIRCRAFT

(75) Inventors: Gunnar Heuer, Horneburg (DE); Carsten Ohlfest, Itzehoe (DE)

(73) Assignee: Airbus Deutschland GmbH, Hamburg (DE)

( * ) Notice: Subject to any disclaimer, the term of this patent is extended or adjusted under 35 U.S.C. 154(b) by 817 days.

(21) Appl. No.: 11/188,360

(22) Filed: Jul. 25, 2005

(65) Prior Publication Data

US 2006/0226649 A1    Oct. 12, 2006

(30) Foreign Application Priority Data

Jul. 23, 2004    (DE) .................... 10 2004 035 853

(51) Int. Cl.
*F16L 5/00*    (2006.01)
(52) U.S. Cl. .................... 285/205; 285/208; 285/139.1; 285/189; 285/223; 285/281
(58) Field of Classification Search ............ 285/46, 285/64, 139.1, 189, 205–208, 280–281, 223
See application file for complete search history.

(56) References Cited

U.S. PATENT DOCUMENTS

| | | | |
|---|---|---|---|
| 0,035,515 A | | 6/1862 | Gibson et al. |
| 0,546,499 A | | 9/1895 | Warren |
| 2,112,352 A | * | 3/1938 | Vetrano .................. 285/148.19 |
| 2,155,080 A | | 4/1939 | Cornell, Jr. |
| 2,409,907 A | | 10/1946 | Shakesby et al. |
| 2,438,077 A | | 3/1948 | Summers |
| 2,441,009 A | * | 5/1948 | Cunningham ............... 285/200 |
| 2,459,752 A | | 1/1949 | Wilson et al. |
| 2,537,678 A | * | 1/1951 | Koetting ...................... 165/157 |
| 2,684,704 A | | 7/1954 | Crowther |
| 2,716,434 A | | 8/1955 | Crowther |
| 3,058,761 A | * | 10/1962 | Christophersen ............ 285/281 |
| 3,972,547 A | | 8/1976 | Itoya |
| 4,015,650 A | | 4/1977 | Anderson |
| 4,289,334 A | | 9/1981 | Riley |
| 4,313,629 A | | 2/1982 | Winterhalter |
| 4,332,404 A | * | 6/1982 | Huffman ..................... 285/223 |
| 4,509,460 A | | 4/1985 | Seltzer |
| 4,687,235 A | | 8/1987 | Stoll |

(Continued)

FOREIGN PATENT DOCUMENTS

DE    29718456 U1    4/1998

*Primary Examiner*—Aaron M Dunwoody
*Assistant Examiner*—Fannie Kee
(74) *Attorney, Agent, or Firm*—Christopher Paradies; Fowler White Boggs P.A.

(57) ABSTRACT

An adapter for coupling connecting pipes for a commercial aircraft comprises an adapter top and an adapter bottom. The adapter bottom has a first adapter pipe that can be positioned within a recess in a floor of the aircraft. An attachment flange is formed to the external circumference of the first adapter pipe, through whose central flange opening the first adapter pipe is led, which attachment flange is positioned on the first adapter pipe end of the first adapter pipe and is attached by one flange side to a bottom floor region of the floor. The adapter top has a second adapter pipe to which a tubular supporting flange is joined. The pipe end region reinforced with said supporting flange of the second adapter pipe is inserted into the pipe cross section of the first adapter pipe.

28 Claims, 2 Drawing Sheets

U.S. PATENT DOCUMENTS

| | | | |
|---|---|---|---|
| 4,874,189 A * | 10/1989 | Gardner .................. 285/39 |
| 5,000,491 A | 3/1991 | Bartholomew |
| 5,054,819 A | 10/1991 | Grunwald |
| 5,083,727 A | 1/1992 | Pompei et al. |
| 5,330,237 A * | 7/1994 | Suzuki et al. ............ 285/281 |
| 5,482,329 A * | 1/1996 | McCall et al. ............ 285/39 |
| 5,593,279 A | 1/1997 | Hayashi |
| 5,779,280 A | 7/1998 | Hedman |
| 5,799,905 A | 9/1998 | Rokita |
| 5,803,508 A * | 9/1998 | Lowella .................... 285/64 |
| 5,850,640 A * | 12/1998 | Pinciaro .................... 4/541.6 |
| 5,967,567 A * | 10/1999 | Nordstrom ............... 285/139.1 |
| 6,065,160 A | 5/2000 | Winn |
| 6,295,664 B2 * | 10/2001 | Fritz et al. ................ 4/679 |
| 6,375,232 B1 | 4/2002 | Robinson |
| 6,488,316 B1 | 12/2002 | Bowman |
| 6,547,159 B1 | 4/2003 | Westby |
| 6,652,006 B1 | 11/2003 | Digiacomo |
| 2004/0140667 A1 * | 7/2004 | Breay et al. ............... 285/189 |
| 2006/0214419 A1 | 9/2006 | Heuer |

* cited by examiner

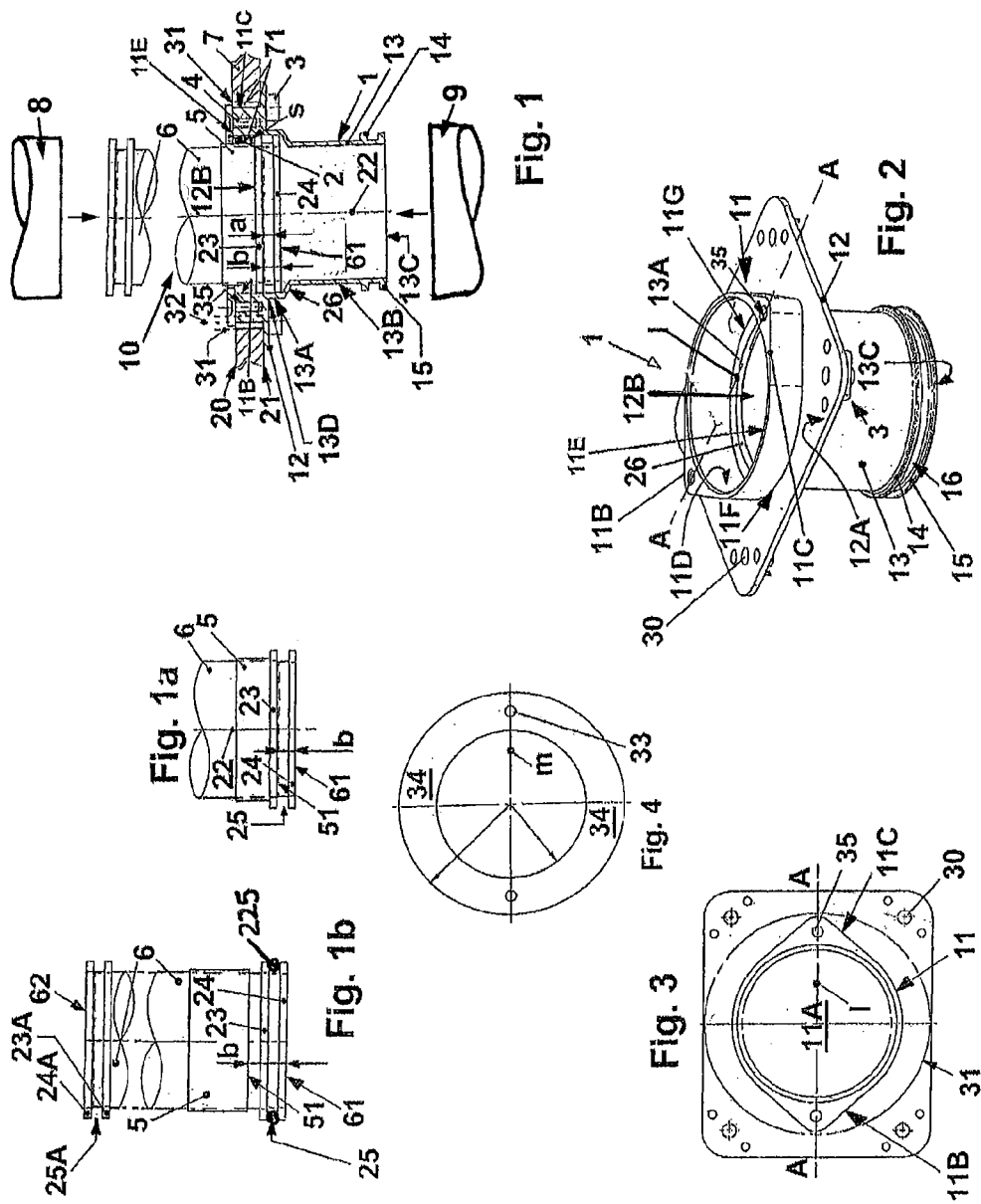

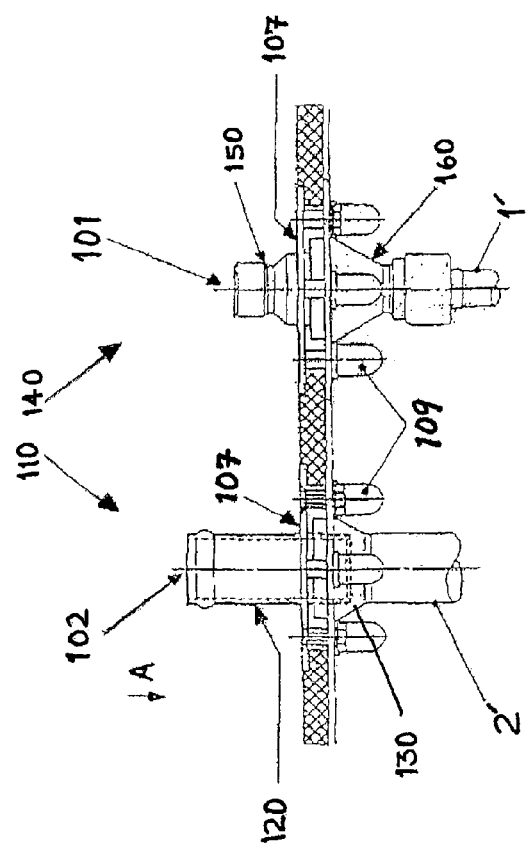
Fig. 5
Prior Art
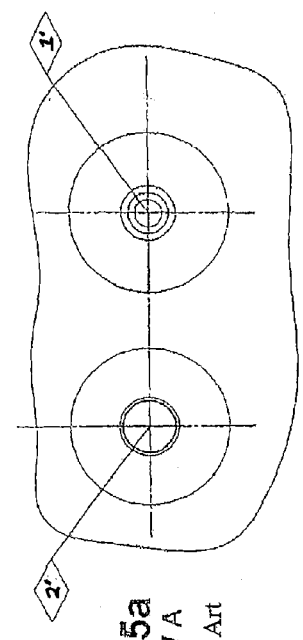
Fig. 5a VIEW A
Prior Art

ADAPTER FOR COUPLING CONNECTING PIPES IN A COMMERCIAL AIRCRAFT

RELATED APPLICATIONS

This application claims the benefit of the filing date of German Patent Application No. 10 2004 035 853.2 filed Jul. 23, 2004 to Gunnar Heuer, the disclosure which is hereby incorporated herein by reference.

FIELD OF THE INVENTION

The invention relates to an adapter for coupling connecting pipes for a commercial aircraft.

BACKGROUND

Aircraft of the "AIRBUS" product family have hitherto not featured an adapter for coupling connecting pipes, which adapter would open up the option wherein with little manual effort corresponding pipe connections for potable water pipes, waste water pipes and vacuum pipes can lead through the floor of a passenger aircraft, without imposing difficulties in the installation of the pipes, and consequently involving a corresponding increased labour outlay. In the past, no such adapter of the type stated was available for pipe installations which for example (intermittently) carry sewage from flushing the toilets (during a flight). Up to now, the installation technology for such sewage pipes, which lead from the passenger deck to the below-floor region and which thus inevitably lead through the floor, involved enlarged holes in the floor through which holes the sewage pipes have been fed to collection containers in place in the below-floor region. For reasons of saving weight, there will not be any alternative in routing such lines because routing lines in an indirect way would understandably involve an increase in aircraft weight. There is thus no need to further consider existing spatial conditions and arrangements. Based on the described routing of sewage pipes it becomes understandable that inadequate sealing-off of sewage pipes leading through the floor against the hole wall has been met with ongoing criticism because the intended tightness in this floor region does not meet the required standards. Furthermore, if one takes into consideration that in the case of large-capacity aircraft, for example the passenger aircraft of the type "A380" pipe connections of the type described in the example lead through several passenger decks, the extent of the sealing loads becomes even clearer, provided said conventional installation technology as shown in the example of the sewage pipes is applied, because the use of floor adapters for vacuum pipes in a commercial aircraft has not hitherto been known in known aircraft types.

Experts know that in aircraft engineering (apart from the presented situation relating to the installation of vacuum pipes) connecting pipes are often used for supplying potable water or for draining waste water, wherein the liquids which are supplied or let out necessarily have to lead through the floor of an aircraft, because the toilets and the wash-rooms are normally installed in the cabin region (passenger region) and it is in these support regions that the connection of corresponding connecting pipes will take place. Although below the floor in the cargo compartment region there are suitable collection containers for the above-mentioned liquids, apart from direct pipe routing through the floor to the above mentioned support regions, which direct pipe routing is not advantageous for service and maintenance reasons, there is only the option of a floor adaptation of the connecting pipes, wherein such a desired adaptation, however advantageous it may seem, will be subject to certain requirements and also difficulties during installation.

At present, Airbus products, in particular those in the long-range fleet, are equipped with adapter plates 110, 140 which comprise a rotationally symmetrical adapter top 120, 150 and adapter bottom 130, 160, and are embedded in a floor plate 107. For attachment, of a known adapter used, to the floor of an aircraft, and for creating a leadthrough from pipes 101, 102 through said floor to pipes 1', 2', a technically skilled person will refer to the attached FIGS. 5, 5a and 5b, which said person will independently contemplate and interpret with their accumulated specialist knowledge and experience. It should be added, because it is not clear from the figures, that attachment of the adapter top and adapter bottom within the floor panel takes place in so-called inserts with the use of screws. Furthermore, three quick-closing screws 109 connect the adapter top to the adapter bottom. It should be mentioned that based on the subsequently stated disadvantages these adapter plates used are not being considered for the adaptation of vacuum connections in Airbus products. Aircraft of the type "Airbus" are not fitted with a vacuum adapter on which adaptation of connecting pipes subject to a vacuum, for example for conveying sewage, can be undertaken, in regard to which vacuum adapter there is no model in the state of the art as far as the particular use (adaptation of vacuum pipes) and intended purpose (conveyance of sewage) in an aircraft is concerned. Such solutions for a (comparable) potable-water connection and waste water connection implemented according to the model shown in said figures provided one does not consider the aspect of particular requirements concerning connecting pipes subjected to a vacuum and intended for adaptation are associated with a disadvantage in that during the transport of potable water or waste water (their intended use), isolated leakages occur which are caused by the (not particularly stable) quick-closing connections which are used for fitting the potable water or waste water connecting pipes to the adapter. There is thus a danger that the water which will exit from the leaking positions of the adapter can penetrate to regions situated underneath the aircraft floor, which is likely to cause safety-relevant damage.

Furthermore, installation personnel have often criticised the design of such adapter plates because fitting requires additional installation effort because final connection of the connecting pipes that are connected to the water system or to the waste water system can only take place below the floor. This measure always requires a change in the horizontal plane by the pipe installer, as a result of which the individual technological expenditure relating to time and preparation is unnecessarily increased. A further point of criticism which (in particular in aircraft engineering) deserves particular attention relates to the weight of the adapter, which weight is by no means favourable, and to the large number of parts for each coupling to be established.

An observer will easily recognise the heavy weight purely by noticing the relatively large dimensions of the adapter tops and bottoms, without having to examine in detail the materials used in these adapter components. A technically skilled person versed in aircraft engineering will notice that with the use of these aforementioned adapter plates corresponding integration problems within regions of the aircraft that are difficult to access are at first unavoidable. Such regions that are difficult to access are often encountered, not only during initial fitting out of the aircraft, but also later during service and maintenance. Thus, the installation personnel who will carry out pipe installations for the galleys and toilets of an aircraft of the type "Airbus A340" will not find any identical pipe connections which are matched to each other, because technologically different connection principles are to be observed. This practised installation technology requires a corresponding plurality of parts relating to different below-floor pipes, which plurality is to be taken into account in the connection of two connecting pipes, which connection is inevitably continued through the floor of the aircraft, and which plurality must also be taken into account in the adaptive connection of these pipes to a pipeline adapter firmly seated in the floor, as said plurality nearly doubles in such an arrangement.

These disadvantages, together with those disadvantages stated in the context of the vacuum pipe installation, provide a technically skilled person with sufficient reason to ponder how to improve the various described connection technologies involving a pipeline adapter such that said technically skilled person can state a solution by means of which the stated disadvantages as set out, of the state of the art, can be overcome and replaced by connection technology for advantageous coupling of connecting pipes in a commercial aircraft.

Accordingly, there may be a desire to improve an adapter for coupling two connecting pipes in a commercial aircraft such that it will be possible to attach the adapter without significant labour outlay to an attachment surface, and so that it will be possible, with the adapter, to implement leakage-free (non-dripping and pressure-proof) adaptation of the connecting pipes, which adaptation can be carried out efficiently. In this approach, a reduction in the multitude of different connecting pipes and a reduction in the multitude of components of the adapter is to be achieved, and furthermore, the need for installation personnel to change from one horizontal plane to another when installing the adapter in the floor is to be obviated.

SUMMARY

With the invention, an adapter is proposed which apart from further advantageous characteristics in use will be suitable for efficient installation in the floor. The design of the adapter will make it possible to preinstall it in floor panels that are to be laid in the aircraft. Furthermore, the adapter will be able to implement leakage-free (non-dripping and pressure-proof) adaptation, which can be carried out efficiently, of the connecting pipes of a vacuum system or a system for liquids, which connecting pipes are installed inside an aircraft, wherein the exchangeability of said connecting pipes is ensured, when necessary, possibly in very confined spaces, even under climatically (more) disagreeable conditions, which exchangeability would otherwise not always be possible without any problems.

For example, an adapter for connecting pipes in a commercial aircraft is provided, wherein connecting pipes are connected to an aircraft's internal vacuum system and which are laid out in the interior of the aircraft, above and/or below a floor, where the adapter comprises an adapter top and an adapter bottom, which both have an adapter body intended for connection to a connecting pipe through which a flow-through medium containing sewage and/or other liquids are conveyed, wherein the identical position of the pipe axes of the adapter top and adapter bottom installed at the end coincides with the position of an adapter reference axis, wherein the adapter bottom comprises a first adapter pipe that is capable of being positioned within a recess in the floor, and wherein an attachment flange is formed to the external circumference of the first adapter pipe, through whose central flange opening the first adapter pipe is led, is formed, the attachment flange positioned on the first adapter pipe end of the first adapter pipe and is attached by one flange side to a bottom floor region of the floor, and the adapter top comprises a second adapter pipe to which on the external circumference a supporting flange is joined, which supporting flange encloses the external circumference of a pipe end region of the second adapter pipe, and whose first supporting flange end closes near or at or at a distance from a first adapter pipe end of the adapter pipe, and at the circumference of the supporting-flange-free pipe end region of the second adapter pipe or of the supporting flange, several ring-shaped elevations are positioned which are arranged side-by-side and at a spacing, such that in each case between two side-by-side elevations, a groove is enclosed and the supporting-flange-free pipe end region, and/or the pipe end region reinforced with the supporting flange, of the second adapter pipe as well as the circumferentially positioned elevations can be inserted into the pipe cross section of the first adapter pipe. In addition, one of these measures intends to implement an arrangement of the adapter that provides a tight seal in the floor, which meets the requirements for tightness in this floor region.

BRIEF DESCRIPTION OF THE DRAWINGS

The drawings show examples of the present invention, which is not limited to the specific examples as represented in the drawings.

The invention is described in more detail in one embodiment, using the example of a solution for a vacuum adapter, with reference to the attached drawings. The following are shown:

FIG. 1 shows a longitudinal section view of the arrangement of a vacuum adapter, positioned in the floor;

FIG. 1a shows a longitudinal section view of a modified adapter top according to FIG. 1;

FIG. 1b shows a longitudinal section view of a further modified adapter top according to FIG. 1;

FIG. 2 shows the arrangement according to FIG. 1 with a straight adapter bottom;

FIG. 3 shows a top view of said adapter bottom according to FIG. 2;

FIG. 4 shows a top view of a retaining ring (also shown in FIG. 1);

FIG. 5 shows a longitudinal section view of known adapter arrangements for a potable-water adapter and a waste water adapter, both positioned in the floor;

FIG. 5a shows view A according to FIG. 5 for the known adapter arrangements;

DETAILED DESCRIPTION

This detailed description and the drawings provide specific examples of the invention, but the invention should not be limited merely to the examples disclosed. Instead, the invention should be limited only by the claims that may eventually issue. Many variations in the system, changes in specific components of the system and uses of the system will be readily apparent to those familiar with the field based on the drawings and description provided.

The adapter arrangements according to FIGS. 5 and 5a have already been discussed in detail. The labour outlay required is extensive and involves installation of the adapter arrangements in the floor (due to the multitude of parts of the adapter used) and a (temporarily) unavoidable change of horizontal plane (from the passenger deck to the cargo compartment deck of the aircraft and vice-versa) and/or a (temporary)

requirement for several persons (at least 2 installers) for a potable-water connection and/or a waste water connection. FIGS. 5a and 5 support such contemplation. As far as implementation of an installation for vacuum pipes which relates to the conveyance (removal) of sewage during a flight, this installation technology (surely for good reason) is not applied at all and only that conventional technology stated in the introduction is applied, because no adapter solution is known. The present deficit becomes clear.

Fitting the pipeline to the adapter (the adapter top and bottom), various pipe connections are used which have, for example, a different pipe cross-section which has to be separately qualified.

For example, an adapter-pipe connection of one example of the present invention which leads through the floor may be used and produces a weight savings (or the avoidance of additional weight), by using an adapter which requires less material and fewer components to an almost uniform minimum dimension. Weight reductions arise due to material substitution and cross-sectional uniformity in the connecting pipes.

With a vacuum adapter, as explained below, for coupling two connecting pipes according to FIGS. 1, 1a, 1b, 2, 3 and 4, which can also be used for potable water or waste water. The examples facilitate installation and reduce the number of adapter components compared to known systems as represented by FIG. 5. The disadvantages stated in the introduction are overcome by the installation technology and connection technique for connecting pipes for the conveyance (removal) of sewage, for example, as illustrated by the drawings, which may include an o-ring 225, such as shown in FIG. 1b, within a gap 25 formed between flanges 23, 24, for example.

The construction and floor arrangement of the adapter for coupling (two) connecting pipes 8, 9 (pipelines) in a commercial aircraft is shown in FIG. 1, for example, which illustrates a vacuum adapter used for the adaptation of installed sewage pipes (vacuum pipes) in commercial aircraft. Sewage pipes (generally designated connecting pipes 1, 10) are installed (so as to be separated) on the inside of the aircraft, above or below said floor 7. This indicated level of detail is provided because the illustrations according to FIGS. 1a, 1b and 2 to 4 comprise detailed views (FIGS. 2 to 4) or implementation of these details (FIGS. 1a, 1b) which are to be viewed in correlation with the illustration of FIG. 1.

The vacuum adapter according to FIG. 1 comprises an adapter top and an adapter bottom 1, 10 which (generally viewed) may form a rotational body. Both adapter parts are designed such that on each of their connection ends 62, 13C may be adapted to a connecting pipe 8, 9 (in FIG. 1 indicated by an arrow). These adapted connecting pipes 8, 9, for example, use pipelines of which a first connecting pipe 8 is installed above a floor 7, and a second connecting pipe 9 is installed below the floor 7.

The pipe connection region of the adapter top and/or adapter bottom 1, 10, may have a line branch piece (not shown in detail), which may be adapted in order to connect a plurality of pipes to a vacuum adapter. Dimensioning of the connection cross sections of the adapter components in correlation with these connecting pipes will be within the expertise of the average technically skilled person and a detailed drawing is not required.

The first connecting pipe 8 may be connected to the adapter top 10 and for the second connecting pipe 9 to be connectable to the adapter bottom 1, provided there is a through-borehole, referred to as floor borehole 31, through the floor 7, in which through-borehole leads through the floor 7 so as to be perpendicular and has an adequate circular borehole cross-section, or is at least (adequately with some slippage) conforms to the cross-sectional form of a so-called collar element 11, wherein the collar element 11 is in part accommodated in the floor, of the adapter bottom 1. The collar element 11 may be positioned within this floor borehole 31 and may become an integral part of a floor component.

Further examples relating to the above-mentioned collar element are provided in the necessary detail within the context of the following explanations.

In one embodiment, the design of that vacuum adapter comprises one adapter bottom 1 and one adapter top 10, both implemented with a pipe-shaped adapter body. The adapter body of the adapter bottom 1 is intended for connection to a first connecting pipe 9, and that of the adapter top 10 is intended for connection to a second connecting pipe 8. As a result of the arrangement of ring-shaped elevations 14, 15, 23, 24, 23A and 24A, which if necessary may be replaced by ring-shaped flanging or beads, the tubular end of the respective adapter body is able to adapt to the connecting pipes 8, 9. When designing the pipe ends of said tubular adapter bodies for a vacuum adapter according to the example, preferably those elevations 14, 15, 23, 24, 23A and 24A are considered of which at least two elevations 14, 15, or 23, 24, or 23A and 24A are positioned beside the respective tubular adapter body on the pipe circumference and on the end of the pipe. These two elevations 14, 15 or 23, 24 or 23A and 24A will each include a groove 16, 25, 25A which serves to accommodate a sealing ring, also referred to as an O-ring. Further details relating to the design of the tubular ends of said tubular adapter bodies will be discussed later. This exemplary information is supplemented by the comment that it is also quite possible to do without the stated adapter top 10; said adapter top need not necessarily be present because (for whatever reasons) one could provide for the first connecting pipe 8 to be inserted directly into the adapter bottom 1.

A liquid (e.g. sewage or some other liquid) may flow through the two connecting pipes 8, 9 which are (individually) adapted to the respective adapter pipe 13, 6 of the vacuum adapter. In order to implement trouble-free installation of the vacuum adapter and thus of the two adapter pipes 6, 13, the positions of the pipe axes should be aligned to the adapter top and adapter bottom 1, 10, which are fitted to the ends and form a vacuum adapter that is attached to the floor.

In this example, the pipe axes of said considered (tubular) adapter bodies should be in line with the pipe axis of an imaginary adapter reference axis 22, which is introduced for the sake of simplicity and to which reference will be made below.

The above-mentioned adapter bottom 1 of said vacuum adapter thus comprises a first adapter pipe 13, modelled on FIG. 1. The latter can be positioned within a recess 71 which (in whatever way) has been made in the floor 7 of the commercial aircraft. A so-called attachment flange 12 (circular pipe flange) has been formed, by joining, to the external circumference of this first adapter pipe 13.

This first adapter pipe 13 will lead through a middle flange aperture 12B of the attachment flange 12 of circular aperture cross-section such that the attachment flange 12 can be formed either to the end of the adapter pipe or at a distance from said adapter pipe. This flange-formed pipe region of the first adapter pipe 13 is further supplemented with a modified collar element 11.

A quick glance at FIG. 1 (and in correlation to FIG. 2) shows that the wall of the first adapter pipe 13 comprises an integrated stepped arrangement implemented with a circular adapter pipe flange 26 drawn inward towards the adapter reference axis 22. Formed to the flange rim on the external circumference of said adapter pipe flange 26 (implemented with a circular pipe flange) is a pipe end of a first adapter pipe section 13A whose non-formed-to (free) pipe end is designated the first adapter pipe end 13D. Formed to the flange rim on the internal circumference of said adapter pipe flange 26 is the pipe end of a second adapter pipe section 13B whose non-formed-to (free) pipe end is designated the second adapter pipe end 13C. The first adapter pipe 13 is thus integrated from a first and a second adapter pipe section 13A, 13B and said adapter pipe flange 26, wherein the latter is arranged with a vertically bevelled (lowered) position of the flange surface, which flange surface is inclined towards the adapter reference axis. Closer study of the diagrams provided also shows that the attachment flange 12 is formed to the first adapter pipe section 13A at the first adapter pipe end 13D. However, it would be imaginable that said attachment flange 12 is formed to the first adapter pipe end 13D at a defined spacing, wherein this spacing refers to a pipe length which for example will reach from the first adapter pipe end 13D to (at the maximum) the flange rim on the external circumference of said adapter pipe flange 26. One flange side of the attachment flange 12 is attached to a lower floor region 21 of the floor 7, wherein according to FIG. 1 the front of the attachment flange 12 is attached to the lower floor region.

Furthermore, the adapter top 10 comprises a second adapter pipe 6 (above-floor pipe) to which on the external circumference a tubular supporting flange 5 (in the form of a pipe connection part) is joined. Joining can take place by rolling the supporting flange 5 onto a pipe region, defined on the external circumference, of the second adapter pipe 6, which supporting flange 5 is stated below.

This supporting flange 5 (as shown in FIGS. 1, 1*a* and 1*b*) encloses the external circumference of a pipe end region of the second adapter pipe 6 whose first supporting flange end 51 closes off near (according to FIG. 1*a*) or on (according to FIG. 1) or at a distance from (according to FIG. 1*b*) a first adapter pipe end 61 of the adapter pipe 6. At the circumference of the supporting-flange-free pipe end region of the second adapter pipe 6 (according to FIGS. 1*a* and 1*b*) or of the supporting flange 5 (according to FIG. 1) in general several ring-shaped elevations are positioned.

These elevations can, spaced apart from each other, (according to the above model of two elevations 14, 15, 23, 24, 23A, 24A for an above-floor pipe and/or below-floor pipe) be arranged side-by-side and at constant or variable spacing, labelled, a in line and in the direction of the adapter reference axis 22. As a rule, constant spacing a is selected, as is for example provided according to FIGS. 1, 1*a*, 1*b*.

In addition, in the arrangement and design of the second adapter body 6 it will further have to be ensured that the supporting-flange-free pipe end region (according to FIGS. 1*a*, 1*b*) which refers to the pipe region on the external circumference, which pipe region adjoins the first adapter pipe end 61 of the second adapter pipe 6, or into which (according to FIG. 1) together with said supporting flange 5 reinforced pipe end region of the second adapter pipe 6 and also all the elevations 23, 24, 23A, 24A positioned on the circumference of the supporting-flange-free pipe end region or the supporting flange 5 can be inserted into the pipe cross section of the first adapter pipe 13.

To return to the above-mentioned collar element 11, which is a floor incorporating (integrated) component of the adapter bottom 1, it should be added that it is formed, by joining, to the attachment flange 12 on the front flange disc, or more precisely (with reference to FIG. 2) joined to a flange front surface 12A which faces away from the flange-attached pipe cross section of the first adapter pipe section 13A. The collar element 11 is positioned on the flange face 12A such that the opening cross-section 11A of the collar element 11 and that of the central flange aperture 12B of the attachment flange 12 and that of the pipe aperture of the first adapter pipe section 13A are arranged so as to be congruent (=so as to coincide). This congruent position of the above-mentioned opening cross-sections requires an identical position of the reference axes of these element parts arranged in this way, of the adapter bottom 1, which position agrees with the position of the adapter reference axis 22.

Modification of the collar element 11 may include at least two shoulder pieces 11B, 11C. Referring to the example, the number of shoulder pieces is limited to two, but the number may be any plurality of shoulder pieces. Such shoulder pieces 11B, 11C are formed on the external circumference to the collar jacket 11D of the collar element 11, wherein they are arranged so as to be opposite a first imaginary line I placed on the centre of the collar element 11, and which protrude from the collar jacket 11D in the manner of ears; as a result of which by means of said shoulder pieces 11B, 11C a ring-shaped collar is modified to become said used collar element 11.

The shoulder pieces 11B, 11C are arranged so as to protrude perpendicularly from the collar jacket 11D. However, angles may be selected, which provide functional shoulder pieces 11B, 11C at angles other than perpendicular to the collar jacket 11D. Above and below the individual shoulder piece 11B, 11C, a top and bottom supporting surface 11E, 11F extends, such as in vertical surface alignment. The surface shape corresponds substantially to a shape of a half-ellipse, wherein the curve at the external circumference of the supporting surfaces 11E, 11F is arranged so as to move away from the collar jacket 11D in an ellipse-like way (with a branch of the ellipse). The term ellipse is not used in its mathematical way herein. The top and bottom supporting surfaces 11E, 11F of the two shoulder pieces 11B, 11C may be planar (flat), wherein the bottom supporting surface 11F of the shoulder pieces 11B, 11C is shaped to the attachment flange 12 so as to rest against the flange face 12A.

The modified collar element 11 may be incorporated as an integral portion of a floor component, and the adapter bottom 1, may be positioned within the floor borehole 31 of the floor 7. The upper supporting surface 11E of the two shoulder pieces 11B, 11C after attachment of the attachment flange 12 to the lower floor region 21 preferably ends flush with the upper floor region 20. The level of the upper supporting surface 11E and of the upper floor region 20 may be arranged so as to coincide to eliminate a tripping hazard. The jacket width 11D of the collar element 11 may coincide with the width of the surface of the two shoulder pieces 11B, 11C, which may be selected to be the same thickness as the floor 7. A blind hole 35 may be drilled approximately in the middle of the upper supporting surface 11E of the individual shoulder piece 11B, 11C, wherein said blind hole 35 comprises a thread on the borehole wall. These two threaded boreholes are for screw-type attachment of a retaining ring 2 whose arrangement will be explained below.

In one example, the above-mentioned retaining ring 2 is arranged on a top supporting surface 11G, situated on the side of the rim of the collar jacket 11D, wherein said top supporting surface 11G is not joined to the front flange surface 12A of the attachment flange 12, and is arranged on said top supporting surface 11E of the two shoulder pieces 11B, 11C. In order to achieve an even supporting level of the retaining ring, it is mentioned that the entire supporting surface of the modified collar element 11 is formed at a level which corresponds to that of these top supporting surfaces 11G, 11E. The retaining ring 2 is made from a solid material. It is a metal ring, comprising stainless steel, preferably titanium. If appropriate, this retaining ring 2 can also be a plastic ring. Its ring surface 34 is circular and flat, as shown in FIG. 4, wherein the internal diameter of the ring surface is smaller than the external diameter of said ring surface. With reference to the example shown, the ring surface 34 of the retaining ring 2 comprises two holes 33, which are arranged facing each other and on an imaginary further line m, wherein the line m is an imaginary line placed on the centre of the circle of the ring surface 34.

In order to implement expert attachment of the retaining ring 2 to the top supporting surface 11E of the two shoulder pieces 11B, 11C of the modified collar element 11, it should be noted that the position of those two threaded blind holes 35 of the two shoulder pieces 11B, 11C is identical with the position of the holes 33 of the retaining ring 2 provided the latter rests against the upper supporting surface 11E of the two shoulder pieces 11B, 11C. Attachment of the retaining ring 2 is by means of an attachment screw 4, which is screwed into the thread of the respective blind hole 35 (detachably attached).

The above-mentioned attachment of the attachment flange 12 to the lower floor region 21 is implemented with reinforced screw connections. Therefore, as shown in FIGS. 2 and 3, the attachment flange 12 comprises several flange boreholes 30, arranged on an imaginary hole circle (not shown), where boreholes are provided for firm detachable attachment of the attachment flange 12 to be attached to the floor 7 by means of screws. The centre of this imaginary hole circle coincides with that of the central flange aperture 12b, assuming that the diameter of said imaginary hole circle exceeds the diameter of the central flange aperture 12b. Also assuming that the form of the flange disc of the attachment flange 12 is for example, square, the flange boreholes 30 are in each case drilled into the flange disc on one (of the four) corner region(s) and situated on the imaginary hole circle.

Beside the respective flange borehole 30 and on the rim side of it, two further additional boreholes (holes) (not designated by a number) are shown which are at a distance from the lateral edges of the square attachment flange 12, which lateral edges are arranged at a right angle in relation to each other, wherein these additional boreholes arranged on the rim side have been drilled perpendicularly on an imaginary line (not shown) leading through the centre of the flange borehole 30, or on an imaginary line placed on the centre of the borehole of the respective flange borehole 30. These two additional boreholes, which are not discussed in detail, are used to attach a plate nut 3, stated later, to a rear flange surface (not designated by a number) of the flange disc of the attachment flange 12, which rear flange surface is situated on the rear of the front flange surface 12A.

Furthermore, with reference to the example shown, four floor boreholes 31 are drilled into the floor 7, wherein said floor boreholes 31 lead through the floor 7 so as to be perpendicular to the upper floor area 20. These floor boreholes 31 are made in the floor 7 accordance with the above-described hole pattern of the flange boreholes 30. The borehole diameter of the individual floor- and flange borehole 31, 30 and the position of the borehole axes 32 of the floor- and flange borehole 31, 30 are arranged identically, provided the modified collar element 11 is positioned in an end position within the recess 71 in the floor 7.

Furthermore, it is provided in each case for one of the (above-mentioned) plate nuts 3, comprising a self-locking hex nut, be arranged at said rear flange surface of the flange disc of the attachment flange 12 underneath the respective flange borehole 30. The plate nut 3 itself is implemented with a square sheet metal body (not shown) to which on two opposing body edges a lug each, comprising a rivet borehole in the middle of the lug, is formed, wherein in the middle of the body a threaded borehole is positioned in the square sheet metal body, wherein the position of the borehole axis 32 of the individual floor borehole 31 and the flange borehole 30 of the attachment flange 12 and the position of a plate nut-hole thread axis of the threaded borehole (not shown especially) of said square sheet metal body are arranged so as to coincide.

It should also be mentioned that the position of said rivet borehole which is positioned in the centre of the lug, and of the above-mentioned two additional boreholes (arranged on the rim side of the flange borehole 30) are identical, wherein the two lugs of the sheet metal body are attached to the attachment flange 12 with a rivet each, which rivet is inserted through the rivet borehole in the centre of the lug and through the additional borehole which communicates with said rivet borehole (arranged on the rim side of the flange borehole 30).

In this example, the above-mentioned attachment of the attachment flange 12 to the lower floor region 21 with those stated screw connections is achieved. This screw attachment (disconnectable fixed connection) of the attachment flange 12 to the lower floor region 21 of the floor 7 is thus in each case effected by means of a screw which is inserted through the individual floor- and flange borehole 31, 30, and whose screw thread is screwed into said threaded borehole (positioned in the centre of the body of the square sheet metal body) of the plate nut 3, wherein with this screw attachment a disconnectable fixed connection of the attachment flange 12 to the lower floor region 21, which is an indirect screw connection, is achieved. Other attachments and fasteners may be used, which achieve the same desired results.

FIG. 1 also shows that the adapter top and the adapter bottom 10, 1 will enclose an air gap, designated gap(s). The adapter bottom 1 is attached to the lower floor region 21 of the floor 7 (by means of the attachment flange 12 attached by means of screws). The adapter top 10 is positioned within the open pipe cross section of the first adapter pipe 13 (below-floor pipe). The open pipe cross section of the first adapter pipe section 13A may include a sealing ring (o-ring) (enveloped by the third and fourth elevation 23, 24) enclosed by the second groove 25, which sealing ring is accommodated on the pipe circumference by the supporting flange 5 or by the second adapter pipe 6, as well as the pipe region. It may be enclosed by the supporting flange, of the second adapter pipe 6 (above-floor pipe) as illustrated in FIGS. 1, 1a, 1b. It may be held on the rim side of the interior region of the pipe wall of the adapter pipe section 13A. The fourth elevation may be arranged so as to be supported by the flange region stepped inward to the adapter reference axis 22 of the adapter pipe flange 26 (which implements a step of the first adapter pipe 13).

The borehole wall of the recess 71, of the floor 7 and the modified collar element 11, positioned within the recess 71 in the floor 7, as well as said collar element and the supporting flange 5 of the adapter top 10 positioned within the recess 71 of the floor 7, enclose a gaps. The gaps may be filled by any filler, such as a moisture repellent adhesive, in order to seal the gap-affected regions of the adapter. The required seal of moisture-critical regions may be implemented by means of an adhesive such as a silicon-like adhesive, which is water repellent, for example. A bushing may also be used with or without an adhesive, such as a flexible bushing.

Following sealing of the above-mentioned air gap aperture(s), the retaining ring 2, which secures said adapter top 10 (from the second adapter pipe 6) against unintended removal (disconnection) from the adapter bottom 1 (from the first adapter pipe section 13A of the first adapter pipe 13) due to the occurring (transmitted) shaking motion, vibration or other shocks to the fuselage of the commercial aircraft during flight operations (in particular in flight), is guided on the external circumference by the second adapter pipe 6 and is placed onto the top supporting surface 11E of the modified collar element 11. The attachment screws 4, which are inserted through the holes 33 of the retaining ring 2 and are screwed into the thread of the two blind holes 35 of the modified collar element 11, will implement attachment of the retaining ring 2 to said collar element 11 and if applicable will also prevent escape of the cured adhesive (generally of the gap-sealing sealing compound).

The following embodiments of the presented vacuum adapter, which can certainly also be used for adapting connecting pipes which are used for conveying liquids (potable water or waste water) are added to the above details.

There is thus the option of implementing the first and the second adapter pipe 13, 6 with a pipe connection piece.

Furthermore, FIGS. 1, 1a and 1b show that the above-mentioned supporting flange 5 can be joined to the second adapter pipe 6 at different positions, wherein no detail is provided concerning the advantages and disadvantages of these different positions. Information about this can be derived from the detail already provided. That information is expanded in relation to the arrangement according to FIGS. 1a and 1b. With reference to those Figures an embodiment would be imaginable according to which generally a supporting-flange end region of the supporting flange 5, positioned near the first supporting flange end 51, which supporting flange 5 is not joined to the second adapter pipe 6 on the external circumference, is spaced apart from the first adapter pipe end 61 of the second adapter pipe 6 so as to be free. With more accurate information it can be stated that the first supporting flange end 51 is spaced apart from the first adapter pipe end 61 in the direction of the pipe axis (the adapter pipe axis 22 of a completely-installed vacuum adapter) at a spacing b.

Furthermore, more detailed information about the arrangement of said elevations is provided in FIGS. 1, 1a and 1b. According to said FIGS. 1a and 1b a second groove 25 is enclosed between a fourth ring-shaped elevation 24, which ends on the pipe circumference on the first adapter pipe end 61 of the supporting-flange-free second adapter pipe 6, and a third ring-shaped elevation 23, which is arranged on the pipe circumference on that supporting-flange-free pipe end region which is arranged so as to be adjacent to the fourth ring-shaped elevation 24, and is positioned near and opposite said first adapter pipe end 61.

Said embodiment according to FIG. 1b also takes into account that a third groove 25A is enclosed by at least one fifth ring-shaped elevation 23A, which on the pipe circumference closes off on the remaining pipe end of the first adapter pipe 6 on the opposite second adapter pipe end 62, and a sixth ring-shaped elevation 24A, which is arranged on the pipe circumference on that pipe end region of the first adapter pipe 6, which pipe end region is arranged so as to be adjacent to the fifth ring-shaped elevation 23A, and is positioned near and opposite said second adapter pipe end 62.

Concerning the embodiment according to FIG. 1 it should be added that a first groove 16 is enclosed on the non-flange-attached free adapter pipe end 13C of the second adapter pipe section 13B of the first adapter pipe 13 between a second ring-shaped elevation 15, which on the pipe circumference closes off on the free adapter pipe end 13C, and a first ring-shaped elevation 14 which is arranged on the pipe circumference on a pipe end region of the second adapter pipe 13B which is arranged so as to be adjacent to the second ring-shaped elevation 15, and is positioned near and opposite said free adapter pipe end 13C.

Further explanations, relating to the examples, which according to the FIGS. 2, 3 and 4 correlate with the structure (explained in detail) of the vacuum adapter according to FIG. 1, have already been provided with reference to those figures. It should be added to these explanations that the form of the flange disc of the attachment flange 12 may also be circular or oval, depending on the (freely selectable) design arrived at that a technically skilled person thinks fit. Furthermore, in the design of the adapter bottom said technically skilled person will take into account that according to FIG. 2 with reference to FIG. 1 the flange face 12A of the flange disc of the attachment flange 12 is larger than the joining surface, formed to said flange disc, of the modified collar element 11. A technically skilled person will also consider that in the construction of the adapter a diameter of the above-mentioned imaginary hole circle (according to FIG. 2) is to be chosen which is larger than that of the central flange aperture 12b. As a precaution, however, said arrangement stated below according to FIG. 2 is mentioned, according to which the front flange surface 12A of the flange disc of the attachment flange 12 is larger than the joining area, formed to said flange disc, of the modified collar element 11.

With said design of the vacuum adapter and its floor installation it will be possible, without any problems, to convey a sewage outflow through the floor 7 of a commercial aircraft. Such a sewage outflow is implemented by means of a vacuum pipe which is for example directly connected to the second connection pipe 9. By a particular arrangement of the elevations on the connection positions (provided for adaptation) of the first and second adapter pipes 13, 6 and equally on those of the connection pipes 8, 9, a coupling can be achieved with the use of a suitable quick-closing mechanism.

LIST OF REFERENCE CHARACTERS

1 Adapter bottom
2 Retaining ring; metal sealing ring; stainless steel, titanium
3 Plate nut; self-locking hexagon nut
4 Attachment screw
5 Tubular supporting flange; rolled-on flange; pipe connection
51 First supporting flange end
6 Second adapter pipe
61 First adapter pipe end
62 Second adapter pipe end
7 Floor
71 Recess(es) (in the floor 7)
8 First connecting pipe
9 Second connecting pipe
10 Adapter top
11 Modified collar element
11A Aperture cross-section
11B First shoulder piece, perforated
11C Second shoulder piece, perforated
11D Collar jacket
11E Top supporting surface (of the shoulder pieces 11B, 11C and of the collar jacket 11D)
11F Bottom supporting surface (of the shoulder piece)
11G Supporting surface (of the collar jacket)
12 Attachment flange (for floor attachment)
12A Front flange surface
12B Central flange aperture
13 First adapter pipe 13A First adapter pipe section
13B Second adapter pipe section
13C Non-attached (free) second adapter pipe end (of the first adapter pipe 13)
13D First adapter pipe end (of the first adapter pipe 13)
14 First ring-shaped elevation (of the adapter bottom 1)
15 Second ring-shaped elevation (of the adapter bottom 1)
16 First groove (of the adapter bottom 1)
20 Upper floor region
21 Lower floor region
22 Adapter reference axis
23 Third ring-shaped elevation (of the adapter top 10 or/third ring-shaped elevation of the second adapter pipe 6 or of the supporting flange 5)
24 Fourth ring-shaped elevation (of the adapter top 10 or/fourth ring-shaped elevation of the second adapter pipe 6 or of the supporting flange 5)
23A Fifth ring-shaped elevation (of the adapter top 10 or/fifth ring-shaped elevation of the second adapter pipe 6 or of the supporting flange 5)
24A Sixth ring-shaped elevation (of the adapter top 10 or/sixth ring-shaped elevation of the second adapter pipe 6 or of the supporting flange 5)
25 Second groove (of the adapter top 10 or/second groove of the second adapter pipe 6 or of the supporting flange 5)
25A Third groove (of the adapter top 10/or third groove of the second adapter pipe 6)
26 Adapter pipe flange, stepped inward towards the adapter reference axis 22
30 Flange borehole (of the attachment flange 12)
31 Floor borehole (of the floor 7)
32 Borehole axis
33 Holes (of the retaining ring 2)
34 Ring surface
35 Blind hole (of the shoulder pieces 11B, 11C of the collar element 11)
a Spacing (between the fourth and the third elevation 14, 15)
b Spacing (between the first supporting flange end 51 and the first adapter pipe end 61)
l Imaginary line
m Further imaginary line
s Gap

The invention claimed is:

1. An adapter for coupling a first connecting pipe and a second connecting pipe in a commercial aircraft through a floor of the aircraft, the first connecting pipe being above the floor of the aircraft and the second connecting pipe being below the floor, wherein the first and second connecting pipes are connected to an aircraft's internal vacuum system and laid out in the interior of the aircraft, the adapter comprising:

an adapter top comprising a rigid adapter pipe for connection to the first connecting pipe; and
an adapter bottom comprising a rigid adapter pipe for connection to the second connecting pipe,
wherein the rigid adapter pipe of the adapter bottom is capable of being positioned within a recess in the floor,
wherein the adapter bottom includes an attachment flange formed on an external circumference of the rigid adapter pipe of the adapter bottom, the attachment flange having a central flange opening attached to the external circumference of the rigid adapter pipe of the adapter bottom, such that a face of the attachment flange is capable of being attached to a lower surface of the aircraft floor, and the adapter top has a tubular supporting flange joined on an external circumference of the rigid adapter pipe of the adapter top, such that the tubular supporting flange encloses the external circumference of a pipe end region of the rigid adapter pipe of the adapter top, and the adapter top has a plurality of ring-shaped elevations extending outwardly from the pipe end region of the rigid adapter pipe of the adapter top and the plurality of ring-shaped elevations are arranged side-by-side and at a spacing, the spacing defining a groove between the plurality of ring-shaped elevations, such that the pipe end region with the plurality of ring-shaped elevations is insertable in a first portion of the rigid adapter pipe of the adapter bottom, and the adapter bottom includes a collar element extending outwardly from the face of the attachment flange such that an opening cross section of the collar element is axially aligned with the central flange opening of the attachment flange and a pipe aperture of the first portion of the rigid adapter pipe of the adapter bottom, and the collar element extends to a height above the face of the attachment flange selected to coincide with a thickness of the aircraft floor, such that an upper supporting surface of the collar element is flush with an upper surface of the aircraft floor when the face of the attachment flange is attached to the lower surface of the aircraft floor.

2. The adapter of claim 1, wherein the plurality of ring-shaped elevations includes two pairs of ring-shaped elevations disposed at a first end of the rigid adapter pipe of the adapter top such that a second groove is defined between a second pair of the two pairs of ring-shaped elevations.

3. The adapter of claim 2, wherein the rigid adapter pipe of the adapter bottom includes a pipe connection portion and the pipe connection portion of the rigid adapter pipe of the adapter bottom includes a transition from a first diameter to a second diameter such that the first diameter is less than the second diameter, and the transition forms a rim on the external circumference and the internal circumference of the pipe connection portion of the rigid adapter pipe of the adapter bottom, wherein the rim prevents pipes from extending past the transition when fitted over a portion of the pipe connection portion of the rigid adapter pipe of the adapter bottom having the first diameter, and prevents pipes from extending past the transition when fitted into another portion of the pipe connection portion having the second diameter.

4. The adapter of claim 3, wherein the attachment flange is attached to the pipe connection portion of the rigid adapter pipe of the adapter bottom.

5. The adapter of claim 2, wherein a groove is defined by a pair of ring-shaped elevations disposed on the rigid adapter pipe of the adapter bottom, which on a pipe circumference closes off on a remaining pipe end of the rigid adapter pipe of the adapter bottom.

6. The adapter of claim 1, wherein each of the plurality of ring-shaped elevations have lateral surfaces extending radially outwardly.

7. The adapter of claim 1, wherein the rigid adapter pipes of the adapter top and the adapter bottom each include a pipe connection portion.

8. The adapter of claim 1, wherein the adapter bottom includes a first shoulder piece formed as a first external surface portion of the collar element and a second shoulder piece formed as a second external surface portion of the collar element circumferentially opposite of the first shoulder piece.

9. The adapter of claim 8, wherein each of the shoulder pieces has a radially outward facing surface relative to a central axis of the attachment flange, such that the radially outward facing surface forms an arcuately-shaped surface extending perpendicularly to the face of the attachment flange.

10. The adapter of claim 9, further comprising:
a retaining ring, wherein the radially outwardly facing surfaces of each of the shoulder pieces define a planar supporting surface extending from the radially outwardly facing surfaces to a radially inwardly facing surface at the opening cross section of the collar element such that the planar supporting surface provides a mounting surface for the retaining ring, and the retaining ring is formed such that the adapter top is capable of being secured to the adapter bottom by mounting the retaining ring on the first shoulder piece and the second shoulder piece.

11. The adapter of claim 10, wherein the retaining ring is made of a metal.

12. The adapter of claim 10, wherein each of the shoulder pieces includes at least one blind hole and each of the at least one blind holes has a position aligned with a position of a corresponding hole in the retaining ring, such that the retaining ring rests against an upper supporting surface of the two shoulder pieces.

13. The adapter of claim 1, wherein the attachment flange includes a flange disc, and a flange face of the flange disc of the attachment flange is larger than a joining surface, formed to the flange disc, of the collar element.

14. The adapter of claim 1, wherein the attachment flange comprises a plurality of flange boreholes, arranged at a constant distance from a central point such that the plurality of flange boreholes are capable of providing a detachable fixed connection of the attachment flange to the floor by using screws, the central point coinciding with a center of the central flange opening, and the constant distance being larger than a radius of the central flange opening.

15. The adapter of claim 14, wherein a plurality of floor boreholes lead through the floor so as to be perpendicular to an upper floor region of the floor of the aircraft and are recessed in the floor, wherein a borehole diameter of the plurality of floor boreholes and the flange boreholes and the position of the borehole axes of the plurality of floor boreholes and the flange boreholes are arranged identically, when the collar element is positioned in an end position within a recess in the floor.

16. The adapter of claim 15, further comprising a plurality of screws, wherein by means of the screws which are inserted through the plurality of floor boreholes and the plurality of flange boreholes, and which are screwed into a threaded borehole of a plate nut, a disconnectable fixed connection of the attachment flange to a lower floor region of the floor of the aircraft is achieved, the connection being an indirect screw connection.

17. The adapter of claim 1, wherein in each case, a plate nut is attached with suitable means to a rear flange surface of a flange disc of the attachment flange, the plate nut further comprising a self-locking hex nut on the rear flange surface of the flange disc of the attachment flange below a respective floor borehole, the flange disc arranged on a rear of a flange face, and a plate nut—hole thread axis of the individual plate nut and the hole axis of an individual floor and flange borehole are arranged so as to coincide.

18. The adapter of claim 1, wherein the attachment flange includes a flange disc and the form of the flange disc of the attachment flange is circular, oval or square.

19. An adapter for coupling a first pipe end to a second pipe end through a hole in a floor of an aircraft, the adapter comprising:
a mounting flange capable of mounting to a lower surface of the floor;
the mounting flange having a first surface and a second surface opposite of the first surface;
a sealing flange disposed at a first end of the adapter and operably joined to the first surface of the mounting flange by an adapter body; and
a collar operably joined to the second surface of the mounting flange;
wherein the first pipe end is sealed by positioning the first pipe end over the sealing flange disposed at the first end of the adapter; and
the second pipe end having a sealing flange joined thereto, such that the sealing flange of the second pipe end is capable of inserting sealably into the collar, wherein the collar has a height above the mounting flange that is selected to coincide with a thickness of the floor, such that an upper supporting surface of the collar is flush with an upper surface of the floor after attachment of the mounting flange to the floor.

20. The adapter of claim 19, wherein the sealing flange disposed at the first end of the adapter comprises a first annular ridge and a second annular ridge, defining an annular gap between the first annular ridge and the second annular ridge, and a sealing ring of an elastic material being is disposed in the annular gap.

21. The adapter of claim 19, wherein the adapter body has a first section, a second section and a transition section;
the first section having an inner diameter and an outer diameter and being operatively joined to one end of the transition section;
the second section having an inner diameter and an outer diameter and being joined at one end to the first surface of the mounting flange and at the opposite end being joined to an opposite end of the transition section, the inner diameter of the second section being greater than the inner diameter of the first section and the outer diameter of the second section being greater than the outer diameter of the first section, wherein the transition section operatively transitions from the inner diameter of the first section to the inner diameter of the second section and from the outer diameter of the first section to the outer diameter of the second section.

22. The adapter of claim 21, wherein the transition section is operably sized to prevent an inner diameter of the first pipe end from being positioned beyond the transition section and an outer diameter of the second pipe end or the sealing flange of the second pipe end from being positioned beyond the transition section.

23. The adapter of claim 19, further comprising a supporting element for connection to the second pipe end.

24. The adapter of claim 23, wherein when the second pipe end and the supporting element are positioned within the collar, the mounting flange encloses a gap between the second pipe end and the collar and encloses any gap between the floor and the collar.

25. The adapter of claim 24, wherein the gap between the second pipe end and the collar is filled in by a moisture-repellent adhesive.

26. The adapter of claim 19, the collar further comprising a collar jacket and two shoulder pieces which protrude in a direction radially outwardly from the collar jacket.

27. The adapter of claim 26, wherein the shoulder pieces each include an upper supporting surface that is flush with a region of the floor after attachment of the mounting flange to the floor.

28. The adapter of claim 19, further comprising a retaining ring for securing a section of the second pipe end from disengaging from the adapter.

* * * * *